United States Patent
Tahata et al.

(10) Patent No.: US 10,184,452 B2
(45) Date of Patent: Jan. 22, 2019

(54) WIND POWER GENERATION SYSTEM AND DC POWER TRANSMISSION SYSTEM

(71) Applicant: Mitsubishi Electric Corporation, Chiyoda-ku, Tokyo (JP)

(72) Inventors: Kazuyori Tahata, Tokyo (JP); Kunio Kikuchi, Tokyo (JP); Makoto Miyashita, Tokyo (JP); Kenji Kamei, Tokyo (JP); Sho Tokoyoda, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 5 days.

(21) Appl. No.: 15/510,056

(22) PCT Filed: Sep. 16, 2014

(86) PCT No.: PCT/JP2014/074435
§ 371 (c)(1),
(2) Date: Mar. 9, 2017

(87) PCT Pub. No.: WO2016/042601
PCT Pub. Date: Mar. 24, 2016

(65) Prior Publication Data
US 2017/0306928 A1   Oct. 26, 2017

(51) Int. Cl.
*H02P 9/00* (2006.01)
*F03D 9/25* (2016.01)
(Continued)

(52) U.S. Cl.
CPC ............. *F03D 9/257* (2017.02); *H01H 9/56* (2013.01); *H02H 3/087* (2013.01); *H02H 7/22* (2013.01);
(Continued)

(58) Field of Classification Search
CPC . H02H 9/02; H02H 7/22; F03D 9/257; H01H 9/56
(Continued)

(56) References Cited

U.S. PATENT DOCUMENTS 4,567,538 A * 1/1986 Arimoto ................ H02H 9/028
361/58
4,805,062 A * 2/1989 Shirouzu .............. H01H 33/596
361/13
(Continued)

FOREIGN PATENT DOCUMENTS

EP        2768102 A1    8/2014
JP    63-188843 U    12/1988
(Continued)

OTHER PUBLICATIONS

*International Search Report (PCT/ISA/210) dated Nov. 18, 2014, by the Japanese Patent Office as the International Searching Authority for International Application No. PCT/JP2014/074435.
(Continued)

*Primary Examiner* — Julio C. Gonzalez Ramirez
(74) *Attorney, Agent, or Firm* — Buchanan Ingersoll & Rooney PC

(57) ABSTRACT

A wind power generation system according to the present invention includes: a DC bus; a plurality of feeders connected to the DC bus for transmitting DC powers to the DC bus; a plurality of wind power generators; a plurality of AC/DC converters connected one by one to each of the wind power generators for converting AC powers generated by the connected wind power generators, into DC powers, and outputting the DC powers to the feeders; and a DC breaker and a diode, which serve as a current limiting unit installed on each of the feeders for preventing a DC current from flowing from the DC bus into the feeder.

7 Claims, 15 Drawing Sheets

(51) Int. Cl.
*H01H 9/56* (2006.01)
*H02H 7/22* (2006.01)
*H02H 9/02* (2006.01)
*H02H 3/087* (2006.01)
*H02J 3/36* (2006.01)
*H02J 3/38* (2006.01)
*H02J 1/10* (2006.01)
*H02P 9/10* (2006.01)

(52) U.S. Cl.
CPC ............... *H02H 9/02* (2013.01); *H02J 3/36* (2013.01); *H02J 3/386* (2013.01); *H02P 9/00* (2013.01); *H02J 1/108* (2013.01); *H02P 9/10* (2013.01); *Y02E 10/72* (2013.01)

(58) Field of Classification Search
USPC ....... 290/44, 55; 307/125, 110, 31; 700/286, 700/287, 288
See application file for complete search history.

(56) References Cited

U.S. PATENT DOCUMENTS

| | | | | |
|---|---|---|---|---|
| 5,650,901 | A | 7/1997 | Yamamoto | |
| 8,503,138 | B2* | 8/2013 | Demetriades | H01H 9/542 361/11 |
| 8,947,843 | B2* | 2/2015 | Juhlin | H01H 71/00 361/115 |
| 9,800,171 | B2* | 10/2017 | Tahata | H02M 7/155 |
| 2006/0097519 | A1* | 5/2006 | Steinke | H02J 3/36 290/44 |
| 2012/0112547 | A1* | 5/2012 | Ghosh | H02J 9/062 307/66 |
| 2014/0055903 | A1* | 2/2014 | Juhlin | H02H 7/222 361/115 |
| 2016/0204595 | A1* | 7/2016 | Park | H02H 3/087 361/10 |
| 2017/0244319 | A1* | 8/2017 | Makino | H02M 3/135 |
| 2017/0288388 | A1* | 10/2017 | Horinouchi | H01H 77/02 |
| 2017/0358917 | A1* | 12/2017 | Kim | H02H 3/18 |
| 2018/0019084 | A1* | 1/2018 | Kim | H02H 3/021 |

FOREIGN PATENT DOCUMENTS

| | | |
|---|---|---|
| JP | 2-56332 U | 4/1990 |
| JP | 5-89753 A | 4/1993 |
| JP | 8-315666 A | 11/1996 |
| JP | 10-228849 A | 8/1998 |
| JP | 11-111123 A | 4/1999 |
| JP | 2003-9537 A | 1/2003 |
| JP | 2003-501993 A | 1/2003 |
| JP | 2003-189695 A | 7/2003 |
| JP | 2006-32077 A | 2/2006 |
| JP | 2007-28882 A | 2/2007 |
| JP | 2012-143076 A | 7/2012 |
| JP | 2013-196895 A | 9/2013 |
| WO | WO 00/74198 A1 | 12/2000 |
| WO | WO 2013/045201 A1 | 4/2013 |
| WO | WO 2015/102307 A1 * | 7/2015 |

OTHER PUBLICATIONS

*Written Opinion (PCT/ISA/237) dated Nov. 18, 2014, by the Japanese Patent Office as the International Searching Authority for International Application No. PCT/JP2014/074435.

*Notification of Reason for Refusal of JP Patent Application No. 2015-506022 with English Translation.

Extended European Search Report dated Apr. 20, 2018, issued by the European Patent Office in corresponding European Application No. 14902226.1. (10 pages).

* cited by examiner

WIND POWER GENERATION SYSTEM AND DC POWER TRANSMISSION SYSTEM

FIELD

The present invention relates to a wind power generation system and a DC power transmission system.

BACKGROUND

In recent years, Europe etc., is advancing the adoption of offshore wind power generation, which employs a windmill installed offshore and performs power generation by utilizing force of wind, because of advantages of offshore areas, such as better wind state and smaller wind turbulence, as compared with onshore areas. In a case where electric powers generated by use of each of a plurality of windmills installed offshore are gathered, the following method is currently used in general: AC powers output from wind power generators, each of which is composed of a windmill and a power generator, are boosted by transformers and are collected, and then the collected electric power is further boosted by a transformer and is transmitted as a high voltage AC power to an onshore area.

Other than the above method, there has been proposed the following method: AC powers output from wind power generators are converted into DC powers by AC (Alternating Current)/DC (Direct Current) converters and are collected as the DC powers, and then the collected electric power is boosted by a DC/DC converter and is transmitted as a high voltage DC power to an onshore area. Since the number of transformers can be reduced because the collection is performed in the form of DC, there is provided an advantage in that the scale of each offshore electric power instrument can be smaller and the cost of each offshore construction can be thereby lowered. Further, since the power transmission to an onshore area is performed in the form of DC, the power transmission loss can be reduced.

In the case of the above system that collects electric powers in the form of DC, it is necessary to include DC breakers to remove accidents and to secure protection. Unlike the AC current, the DC current does not have a current zero point, and so the DC breakers need to form a current zero point in some manner.

As a manner of forming such a current zero point, for example, in a DC breaker disclosed in Patent Literature 1, a commutation circuit composed of a capacitor and a reactor is connected in parallel with a breaking part, and an electric charge, which has been pre-charged in the capacitor, is discharged to superpose a current, which is resonant with the reactor, onto a DC current, and thereby to form a current zero point.

CITATION LIST

Patent Literature

Patent Literature 1: Japanese Patent Application Laid-open No. 2013-196895

SUMMARY

Technical Problem

However, in the case of a system configured such that electric powers generated by respective wind power generators are collected in the form of DC, the following problem is caused: for example, it is assumed that a power generation system has a configuration in which a plurality of feeders that are DC passages are connected to a bus and a plurality of wind power generators are connected to each of the feeders. In the power generation system having this configuration, if an accident occurs in one of the feeders, all electric powers generated by the respective wind power generators connected to the other healthy feeders in which an accident does not occur, flow into the accident point through the bus. Consequently, the accident current may become very large. In this case, the cables and each electric power instruments needs to have an excessive current capacity, and thereby increases the cost and scale. In particularly, since the accident current is DC and thus does not have a current zero point, a breaker for cutting off the accident current needs to include equipment for forming the current zero point. Accordingly, there is a problem in that the scale of the equipment for forming the current zero point as well as the breaking part inevitably increases.

The present invention has been made in view of the above, and an object of the present invention is to provide a wind power generation system and a DC power transmission system that can reduce the scale and cost of a device necessary for protection of a network where electric powers generated by wind power generators are collected in the form of DC.

Solution to Problem

To solve the above problem and the object, the present invention provides a wind power generation system comprising: a DC bus; a plurality of feeders to transmit DC powers to the DC bus, the feeders being connected to the DC bus; a plurality of wind power generators; a plurality of electric power conversion devices to convert AC powers generated by the wind power generators connected to the electric power conversion devices, into DC powers, and output the DC powers to the feeders, the electric power conversion devices being connected one by one to each of the wind power generators; and a current limiting unit to prevent a DC current from flowing from the DC bus into each of the feeders, the current limiting unit being installed on each of the feeders.

Advantageous Effects of Invention

According to the present invention, there is provided an effect capable of lessening the duty of each instrument in the network, and thereby reducing the scale and cost of a device necessary for protecting the network.

DESCRIPTION OF EMBODIMENTS

Exemplary embodiments of a wind power generation system and a DC power transmission system according to the present invention will be explained below in detail with reference to the accompanying drawings. The present invention is not limited to the following embodiments.

First, with reference to FIG. 1, an explanation will be given of a basic wind power generation system and its problems, before explanations of the respective embodiments.

Figure 1:
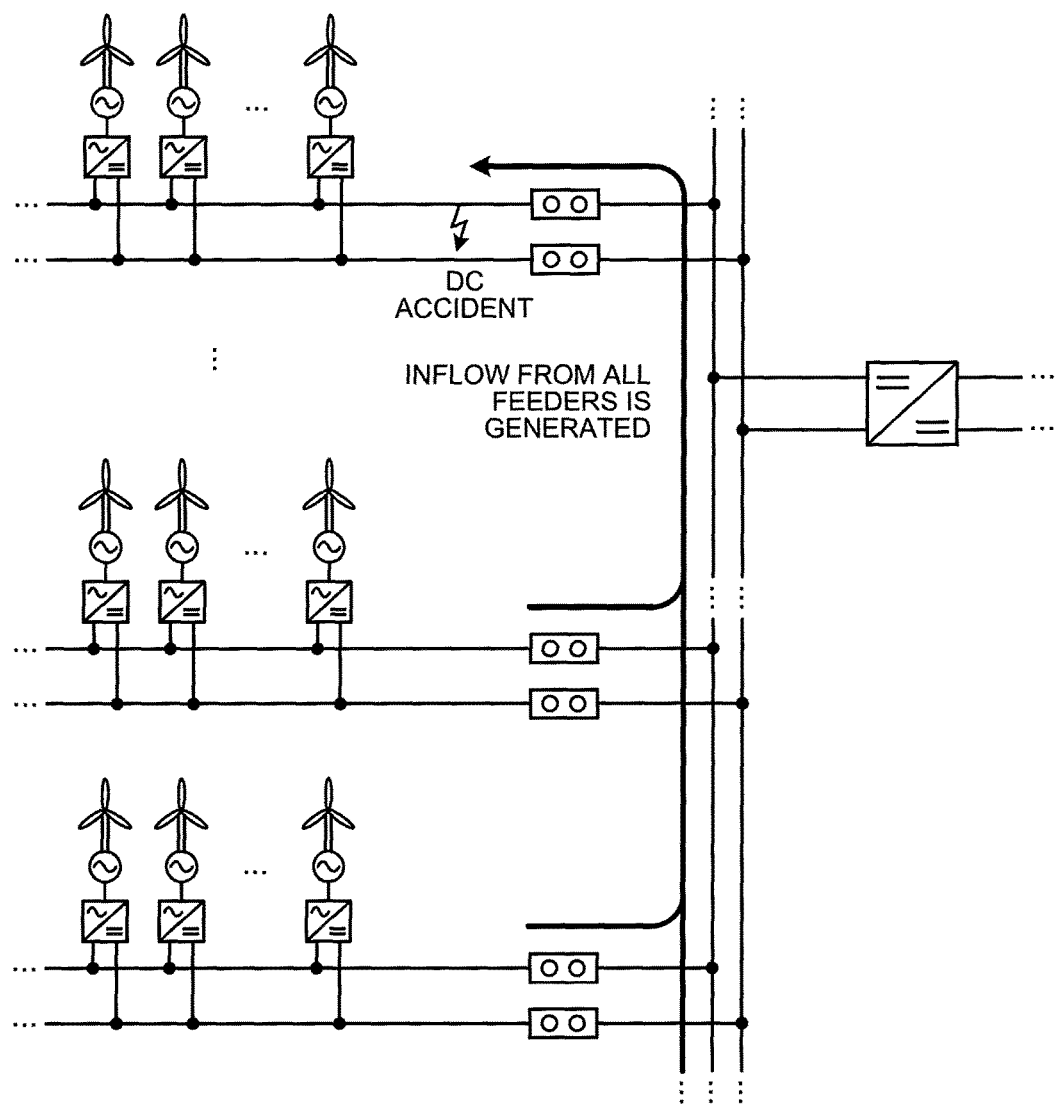
FIG. 1 is a view illustrating a configuration example of a conventional wind power generation system.

FIG. 1 is a view illustrating a configuration example of a conventional wind power generation system. In the wind power generation system illustrated in FIG. 1, a plurality of pairs of a wind power generator and an AC/DC converter are connected to each of a plurality of lines of feeders. The wind power generator is composed of a windmill and a power generator, and the respective feeders are connected to a bus. Further, on each of the feeders, a DC breaker is installed for cutting off a current at the time of, e.g., occurrence of an accident. The bus is connected to a DC/DC converter so that a DC power collected from the respective feeders can be boosted into a high voltage DC power and transmitted. In this configuration, if a DC accident, such as a ground fault, occurs in the feeder, as illustrated in FIG. 1, all electric powers generated by respective windmills connected to the feeders in which an accident does not occur, flow into the accident point. Accordingly, the DC breaker inserted in each of the feeders inevitably needs a configuration that can cut off all the currents flowing from the other feeders, and so the cost and scale of the DC breakers are increased. On the other hand, according to each of the embodiments described below, it is possible to prevent an increase in the cost and scale of the DC breakers.

First Embodiment

Figure 2:
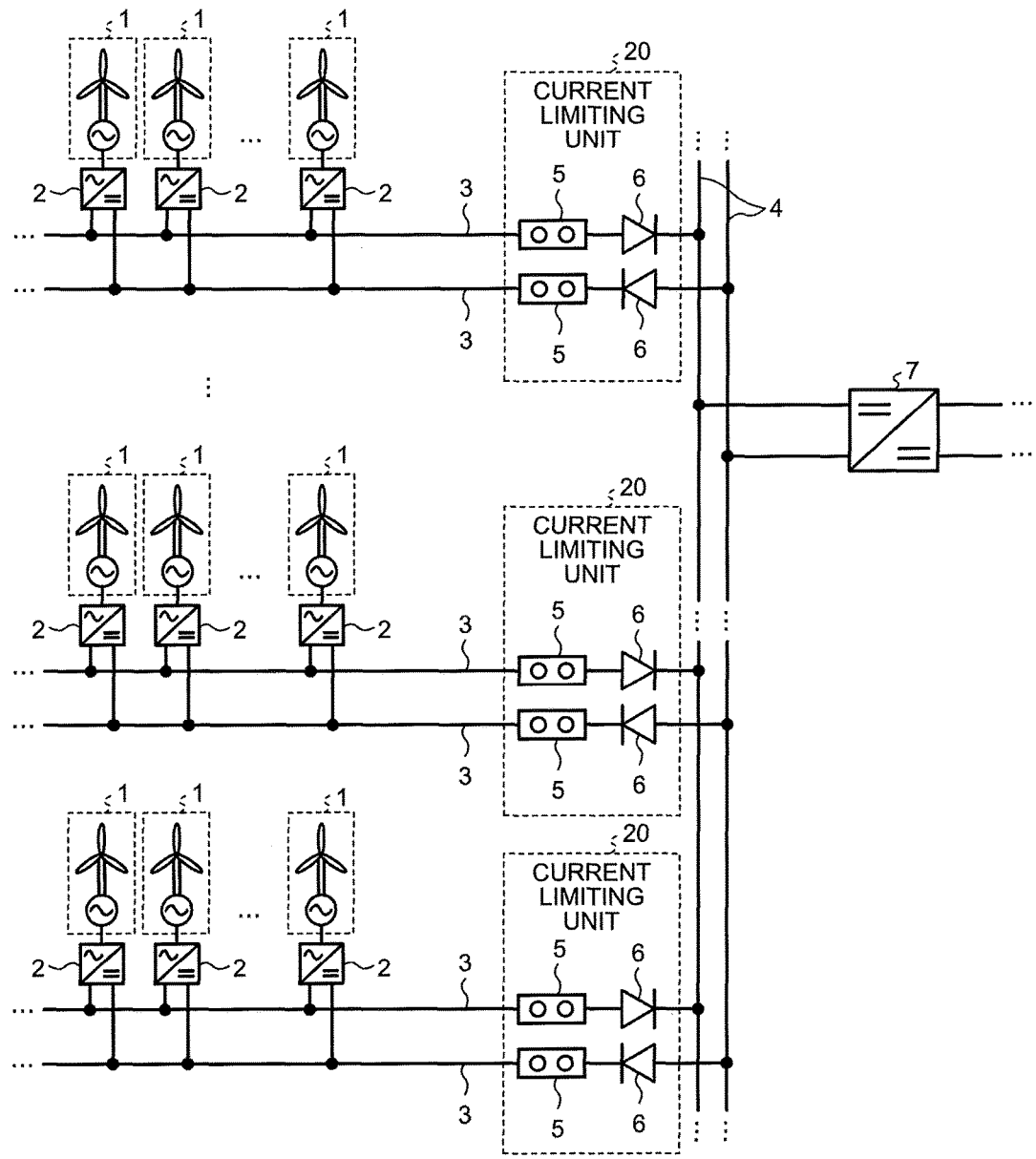
FIG. 2 is a view illustrating a configuration example of a wind power generation system according to a first embodiment.

FIG. 2 is a view illustrating a configuration example of a wind power generation system according to a first embodiment of the present invention. The wind power generation system according to this embodiment is configured by including: wind power generators 1 that are installed offshore and each composed of a windmill and a power generator; a plurality of AC/DC converters 2 serving as electric power conversion devices that are combined with the wind power generators 1 one by one and convert AC powers output from the wind power generators 1 into DC powers; a plurality of lines of feeders 3 each of which is connected to the plurality of AC/DC converters 2 and transmits DC powers output from the connected AC/DC converters 2; a DC bus 4 that collects DC powers from each of the plurality of lines of feeders 3; DC breakers 5 and diodes 6 that serve as a current limiting unit 20 that is inserted in series with the connection point between each of the plurality of lines of feeders 3 and the DC bus 4, and prevents an excessive currents from flowing through the feeder 3; and a DC/DC converter 7 that boosts a DC power collected through the DC bus 4. The high voltage DC power, which is the DC power boosted by the DC/DC converter 7, is transmitted to an onshore network (not shown).

Figure 3:
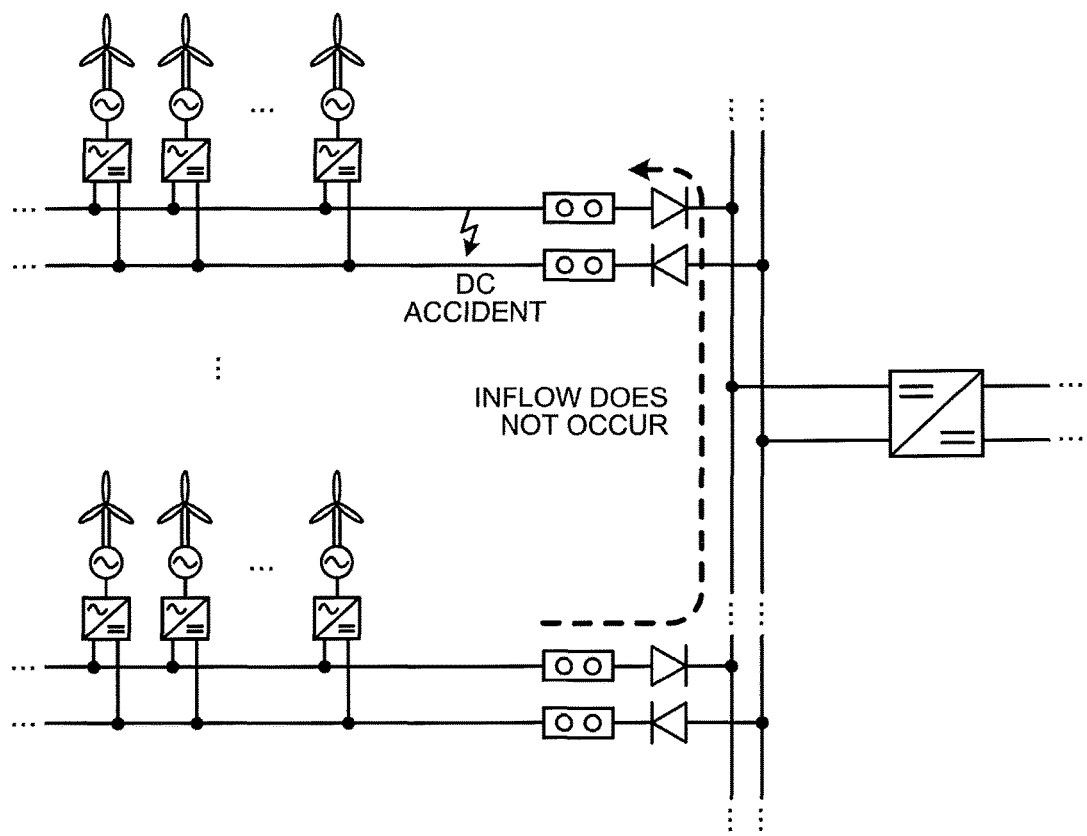
FIG. 3 is a view illustrating an accident current in a case where an accident occurs in a feeder.
Figure 4:
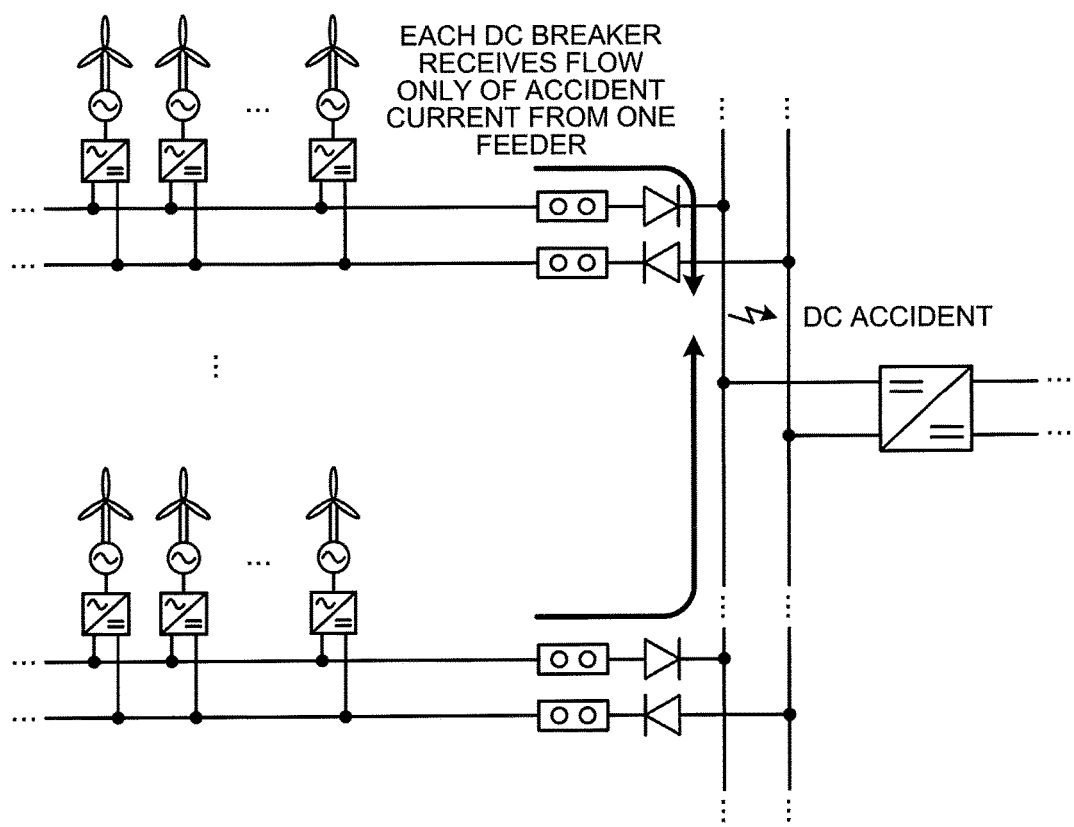
FIG. 4 is a view illustrating an accident current in a case where an accident occurs in a DC bus.

As illustrated in FIG. 2, in the wind power generation system according to this embodiment, a diode 6 is inserted in each of the feeders 3. Consequently, if an accident occurs between the wind power generator 1 and the DC breaker 5, as illustrated in FIG. 3, no current flows from healthy feeders into the feeder in which the accident occurs, and so the duty of the DC breakers 5 is greatly lessened. Depending on the configuration of the wind power generation system, there may be a case where an accident occurs in the DC bus 4. However, in this case, as illustrated in FIG. 4, no current flows into a specific feeder 3 from the other feeders 3. Consequently, the DC breakers 5 are required to have ability only for cutting off the accident current flowing from the respective wind power generators 1 connected to each line of the feeders 3. That is, the DC breakers 5 can be made compact and achieved with a lower cost. Further, since an accident current to flow through each of the feeders 3 and the DC bus 4 as well as through the DC breakers 5 is reduced, the duty about the conduction capacity of cables or the like applied to them is lessened. Further, in the wind power generation system, the current flowing direction in the steady state is a one-way direction, specifically, a direction from each of the wind power generators 1 toward the DC bus 4, and so there is no need to consider bidirectional interchanging. Accordingly, even if the diodes 6 are inserted in the feeders 3 serving as power transmission lines, there is no problem caused in operating the network.

Figure 5:
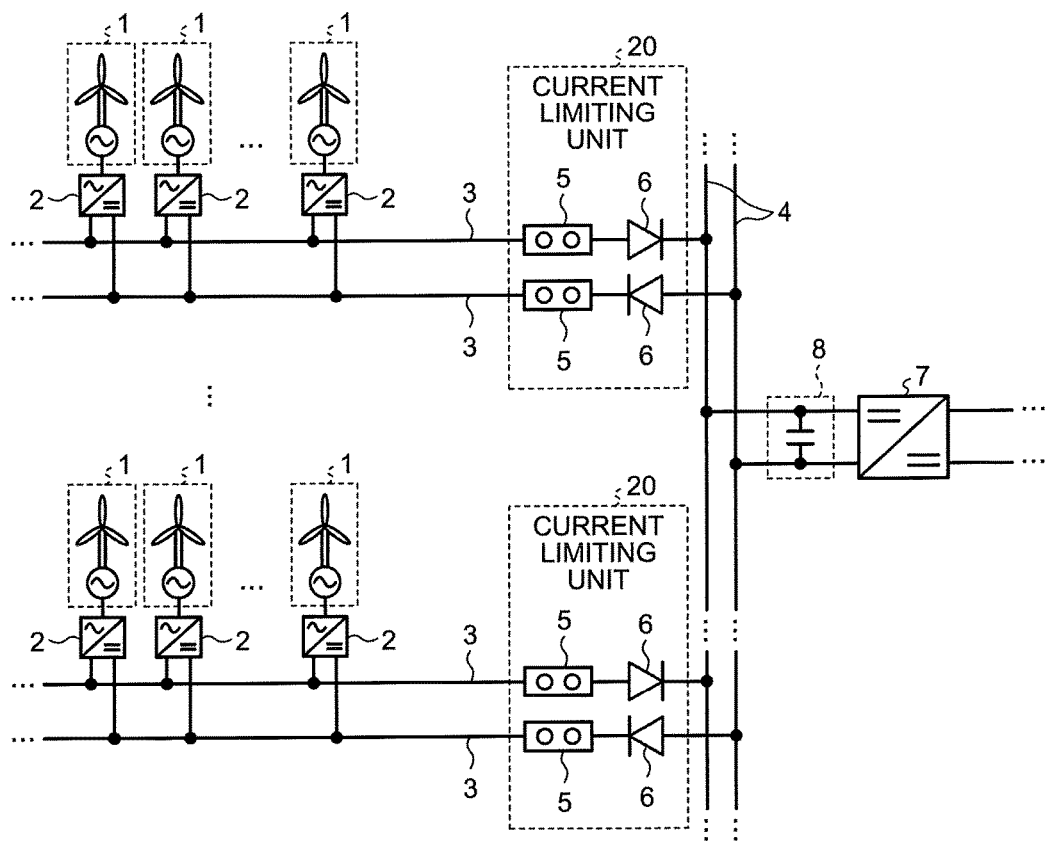
FIG. 5 is a view illustrating a configuration example of a wind power generation system equipped with a smoothing capacitor.
Figure 6:
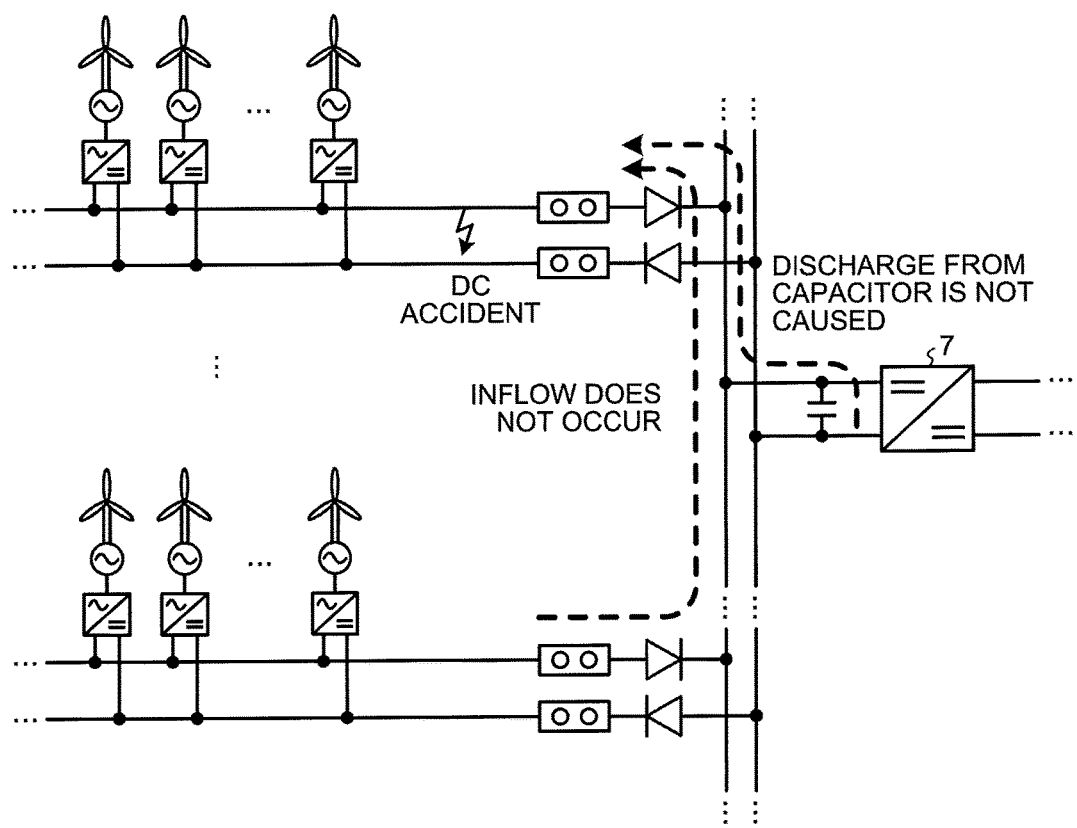
FIG. 6 is a view illustrating an accident current in a case where an accident occurs in a feeder of the wind power generation system illustrated in FIG. 5.

Further, as illustrated in FIG. 5, a smoothing capacitor 8 may be connected between the positive and negative sides at a position between the DC/DC converter 7 and the DC bus 4, in order to smooth the output from each of the wind power generators 1. In this case, if an accident occurs in the feeder 3, a discharge current from the smoothing capacitor 8 is superposed onto the accident current, and thereby the accident current further becomes larger. However, according to this embodiment, since the diodes 6 are inserted in the feeders 3, as illustrated in FIG. 6, the discharge from the smoothing capacitor 8 is also prevented. In this way, even in a case where the smoothing capacitor 8 is included, this embodiment further effectively serves to reduce the accident current.

Further, since the DC breaker 5 is connected in series with the diode 6, the DC breaker 5 is only required to have a configuration to cut off a current by opening the electrical path only when the current that flows in a direction not blocked by the diode 6 exceeds a specified value. Thus, the DC breakers 5 can be made compact.

As described above, the wind power generation system according to this embodiment includes: the plurality of AC/DC converters 2 that convert AC powers generated by the wind power generators 1 into DC powers; the plurality of lines of feeders 3 that transmit DC powers output from the respective AC/DC converters 2; the DC bus 4 that collects DC powers from each of the plurality of lines of feeders 3; and the DC breaker 5 and diode 6 inserted in series with the connection point between each feeder 3 and the DC bus 4. The diodes 6 prevent currents from flowing into the feeders 3 in which they are inserted, from the other feeders 3. Accordingly, the duty of the instrument of each network, such as the DC breakers 5, can be lessened, and thereby each instrument can be made compact and achieved with a lower cost.

Incidentally, in this embodiment, the explanation has been given of the configuration including the wind power generators 1 installed offshore, but the installation location of the wind power generators 1 is not limited to an offshore area. There may be adopted a configuration including wind power generators 1 such that some or all of them are installed onshore.

Figure 7:
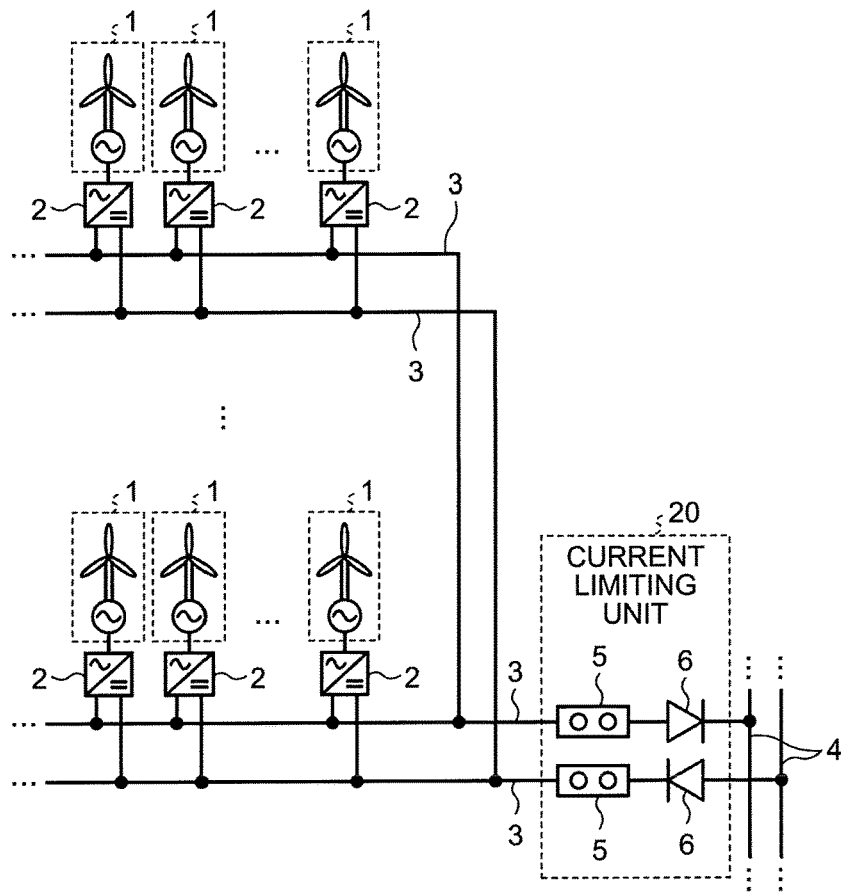
FIG. 7 is a view illustrating another configuration example of the wind power generation system according to the first embodiment.

Further, the connection relationship between the plurality of lines of feeders 3, the DC bus 4, and the DC breakers 5 and diodes 6 is not limited to that illustrated in FIG. 2. For example, there may be adopted a configuration including the connection relationship illustrated in FIG. 7, which is specifically formed such that a plurality of lines of feeders 3 are provided with DC breakers 5 and diodes 6 in common. With this configuration, the duty of the DC breakers 5 to cut off currents and the duty of the diodes 6 to carry currents become larger, but it is possible to reduce the number of DC breakers 5 and diodes 6.

Second Embodiment

An explanation will be given of a wind power generation system according to a second embodiment. Hereinafter, description about the constituent elements corresponding to those of the embodiment described above will be omitted.

Figure 8:
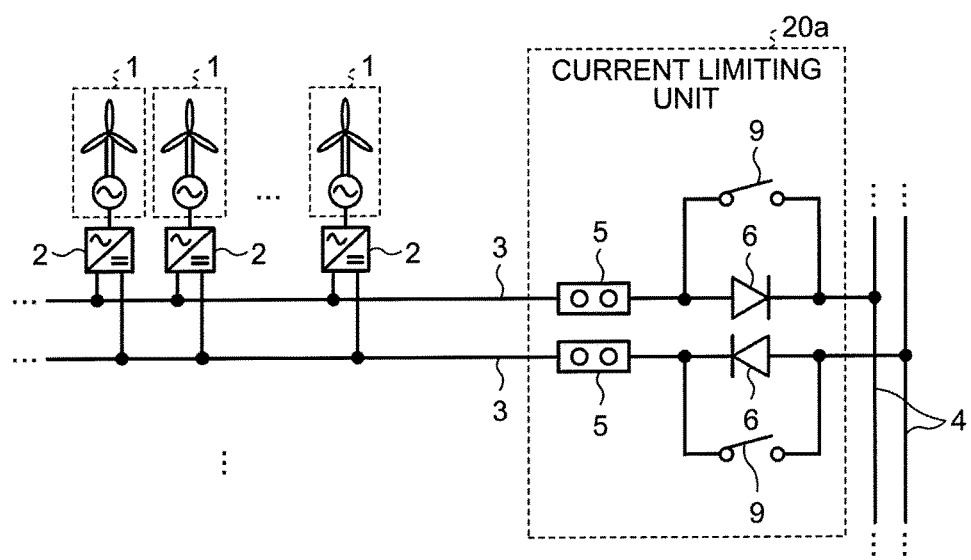
FIG. 8 is a view illustrating a configuration example of a wind power generation system according to a second embodiment.

FIG. 8 is a view illustrating a configuration example of a wind power generation system according to the second embodiment. As illustrated in FIG. 8, the wind power generation system according to this embodiment includes switches 9 added to the wind power generation system according to the first embodiment illustrated in FIG. 2. The switches 9 are respectively connected in parallel with the plurality of diodes 6 to form a current limiting unit 20*a*, and are normally set in the open state. Here, FIG. 8 omits illustration of the DC/DC converter 7 and so forth, which are illustrated in FIG. 2. The overall configuration of the system is the same as that of the wind power generation system according to the first embodiment illustrated in FIG. 2. However, the overall configuration of the system may be made the same as the configuration illustrated in FIG. 7.

In the wind power generation system, the current flowing direction through the feeders 3 in the steady state is a one-way direction from the wind power generators 1 side toward the DC bus 4. However, at initial activation or at re-activation after maintenance, there is a case where the wind power generators 1 and the AC/DC converters 2 need a power supply. Accordingly, in order to achieve supply of an electric power from the DC bus 4 at the activation, bidirectional conduction may become necessary. With such a case taken into consideration, according to this embodiment, the switches 9 are respectively disposed in parallel with the diodes 6, and the switches 9 are set in the open state in the steady state, and are closed at an occasion of requiring bidirectional conduction, such as at the initial activation or at the re-activation after maintenance, so as to achieve the supply of the electric power from the DC bus 4 to the wind power generators 1 and the AC/DC converters 2.

The conduction current only needs to be a current that flows to activate the wind power generators 1 and the AC/DC converters 2, and so the switches 9 are not required to take an excessive conduction duty. Further, the switches 9 are operated only at the initial activation or at re-activation after maintenance, and so the switches 9 are not required to have a high operation speed. In addition, when the wind power generators 1 and the AC/DC converters 2 start their operation after the supply of the electric power from the DC bus 4, the current flowing direction through the switches 9 is reversed and thereby a current zero point is necessarily naturally formed. Accordingly, the switches 9 do not need to be equipped with means for forming the current zero point. In this way, the switches 9 can be formed of a simple application, without being subjected to an excessive duty.

As described above, the wind power generation system according to this embodiment has a configuration including the switches 9 respectively connected in parallel with the diodes 6. Consequently, even in a system in which at least one group of the wind power generator 1 and the AC/DC converter 2 requires the electric power at the activation, it is possible to operate this system without additionally providing a device for supplying an activation electric power. Further, as in the first embodiment, it is possible to lessen the duty of the instrument of each network, such as the DC breaker.

Third Embodiment

An explanation will be given of a wind power generation system according to a third embodiment. Hereinafter, description about the constituent elements corresponding to those of the embodiments described above will be omitted.

Figure 9:
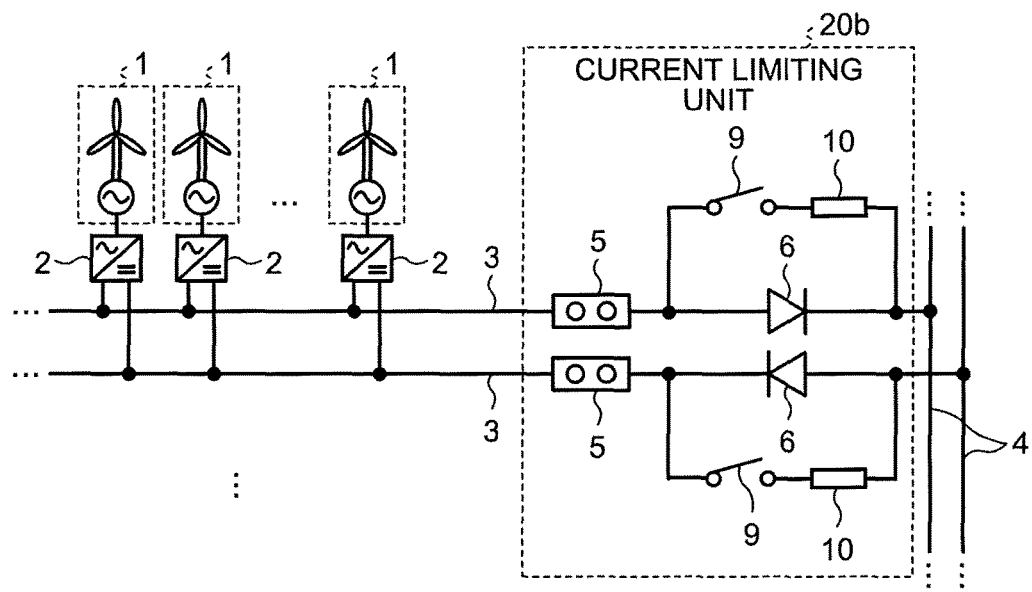
FIG. 9 is a view illustrating a configuration example of a wind power generation system according to a third embodiment.

FIG. 9 is a view illustrating a configuration example of the wind power generation system according to the third embodiment. As illustrated in FIG. 9, the wind power generation system according to this embodiment includes current limiting elements 10 added to the wind power generation system according to the second embodiment illustrated in FIG. 8. The current limiting elements 10 are respectively connected in series with the switches 9 to form a current limiting unit 20*b*. Here, as in FIG. 8, FIG. 9 omits illustration of the DC/DC converter 7 and so forth, which are illustrated in FIG. 2. The overall configuration of the system is the same as that of the wind power generation system according to the first embodiment illustrated in FIG. 2. However, the overall configuration of the system may be made the same as the configuration illustrated in FIG. 7.

In the wind power generation system according to this embodiment, when the switches 9 are closed and thereby supply an electric power from the DC bus 4 to at least one group of the wind power generators 1 and the AC/DC converters 2, the wind power generators 1 and the AC/DC converters 2 start their operation. After the wind power generators 1 and the AC/DC converters 2 start their operation, the generated electric powers flow into the feeders 3. At this time, since the wind power generation system includes the current limiting elements 10 respectively connected in series with the switches 9, almost all the electric powers output from the AC/DC converters 2 can flow into the diodes 6 even before the switches 9 are opened. In this case, almost no currents flow through the switches 9, and so each of the switches 9 can be formed of an instrument to be subjected to a small duty to cut off currents, such as a disconnector.

As described above, the wind power generation system according to this embodiment has a configuration including the serial circuits, each of which is composed of the switch 9 and the current limiting element 10, such that the serial circuits are respectively connected in parallel with the diodes 6. Consequently, it is possible to lessen the duty of the switches 9 to cut off currents.

Fourth Embodiment

An explanation will be given of a wind power generation system according to a fourth embodiment. Hereinafter, description about the constituent elements corresponding to those of the embodiments described above will be omitted.

Figure 10:
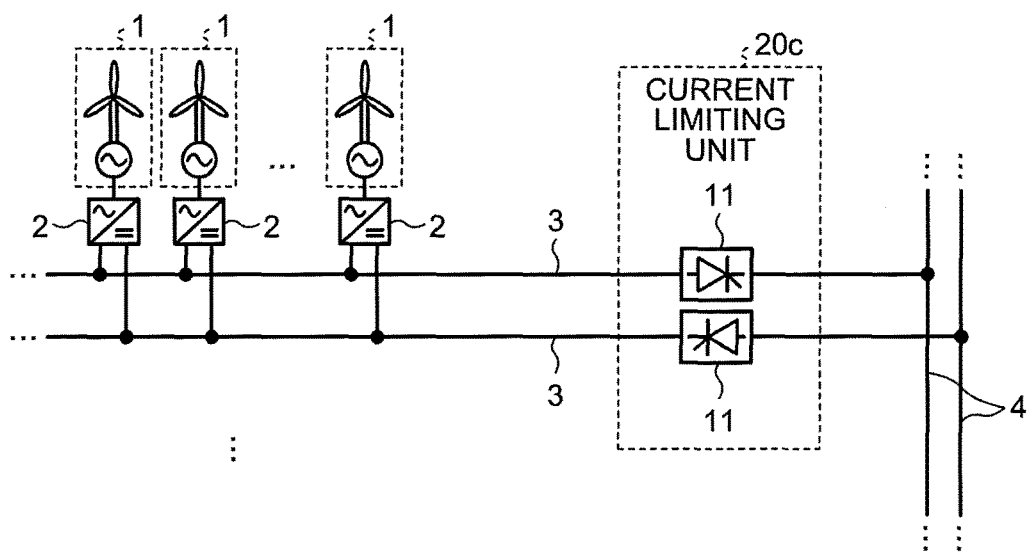
FIG. 10 is a view illustrating a configuration example of a wind power generation system according to a fourth embodiment.

FIG. 10 is a view illustrating a configuration example of the wind power generation system according to the fourth embodiment. As illustrated in FIG. 10, the wind power generation system according to this embodiment includes semiconductor DC breakers 11 in place of the DC breakers 5 and the diodes 6 included in the wind power generation system according to the first embodiment illustrated in FIG. 2. In other words, the current limiting unit 20 composed of the DC breakers 5 and the diodes 6 is replaced with a current limiting unit 20c composed of the semiconductor DC breakers 11. Here, as in FIGS. 8 and 9, FIG. 10 omits illustration of the DC/DC converter 7 and so forth, which are illustrated in FIG. 2. The overall configuration of the system is the same as that of the wind power generation system according to the first embodiment illustrated in FIG. 2. However, the overall configuration of the system may be made the same as the configuration illustrated in FIG. 7.

For example, each of the semiconductor DC breakers 11 is formed of a unidirectional conducting element, such as a thyristor. Consequently, if an accident occurs in the feeder 3, the semiconductor DC breakers 11 can cut off the accident current flowing from the DC bus 4 side toward the accident point. In this configuration, the semiconductor DC breaker 11 has both of the DC breaker function and the diode function, and so it is possible to reduce the number of instruments. Further, since semiconductor elements are used for performing cutoff, it is possible to remove an accident with a high speed.

As described above, the wind power generation system according to this embodiment includes the semiconductor DC breakers 11 connected in series with the connection points between the feeders 3 and the DC bus 4. Consequently, it is possible to lessen the duty of each of the network instruments, and further to reduce the number of instruments and to perform the cutoff with a high speed.

Fifth Embodiment

An explanation will be given of a wind power generation system according to a fifth embodiment. Hereinafter, description about the constituent elements corresponding to those of the embodiments described above will be omitted.

Figure 11:
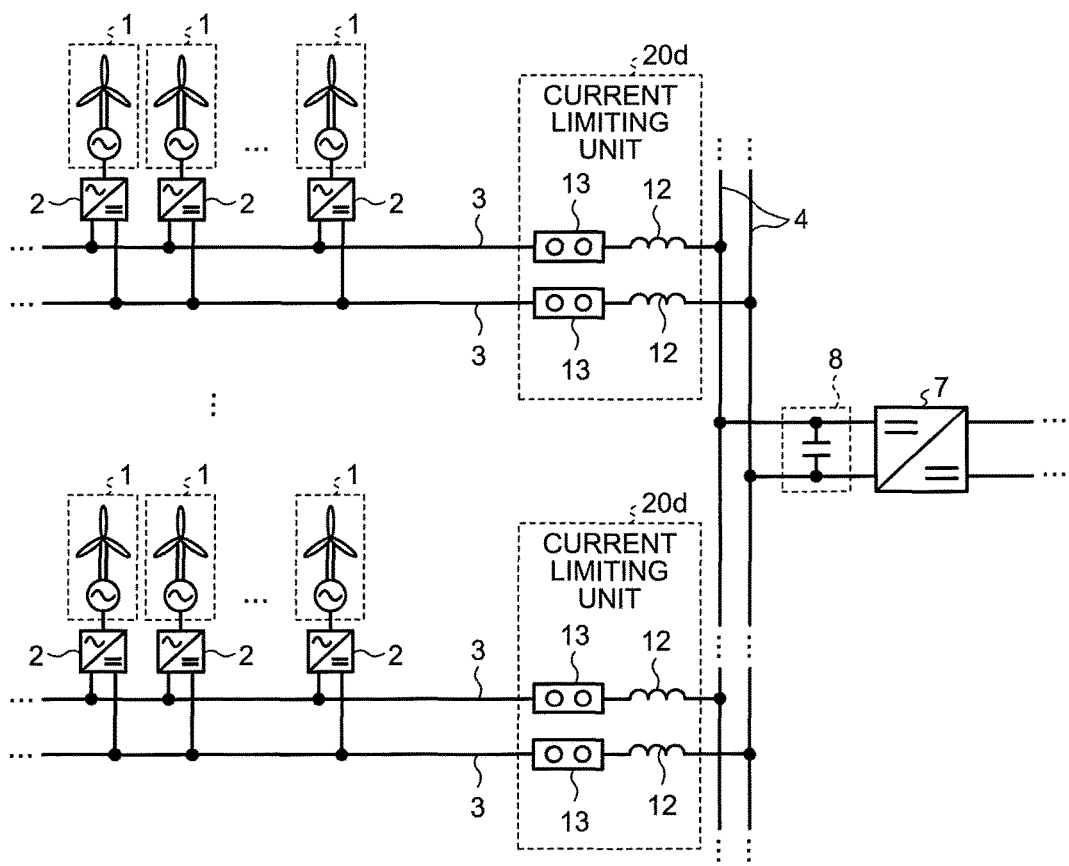
FIG. 11 is a view illustrating a configuration example of a wind power generation system according to a fifth embodiment.

FIG. 11 is a view illustrating a configuration example of the wind power generation system according to the fifth embodiment. As illustrated in FIG. 11, the wind power generation system according to this embodiment includes AC breakers 13 and reactors 12 in place of the DC breakers 5 and the diodes 6 included in the wind power generation system according to the first embodiment illustrated in FIG. 2. In other words, the current limiting unit 20 composed of the DC breakers 5 and the diodes 6 is replaced with a current limiting unit 20d composed of the AC breakers 13 and the reactors 12. Further, a smoothing capacitor 8 is inserted between the DC/DC converter 7 and the DC bus 4.

Figure 12:
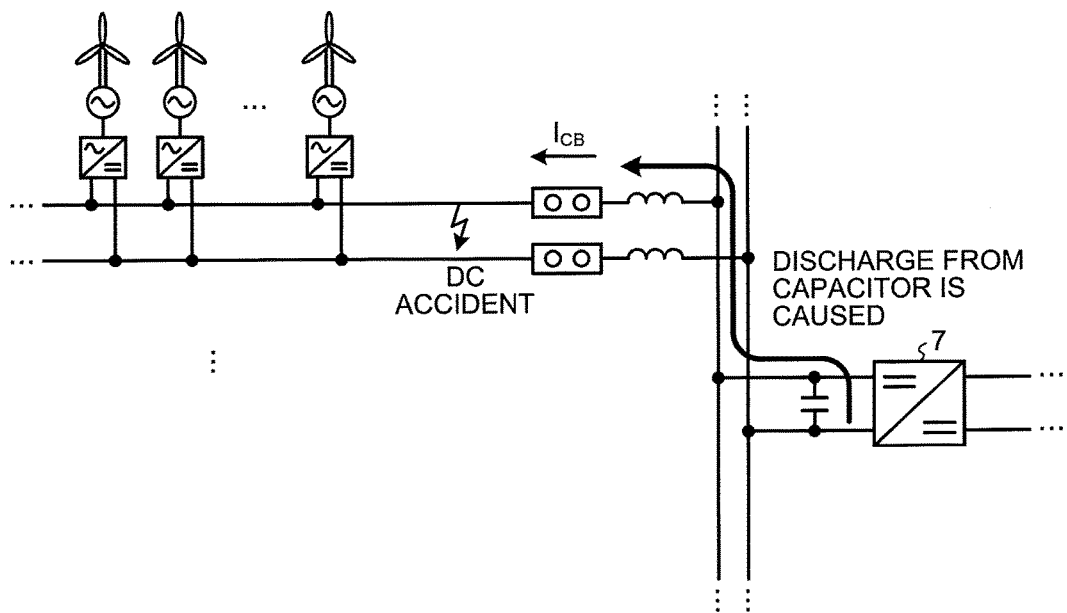
FIG. 12 is a view for explaining an operation of the wind power generation system according to the fifth embodiment.
Figure 13:
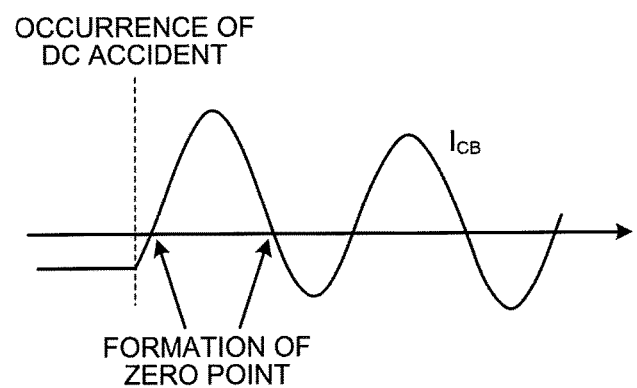
FIG. 13 is a view for explaining the operation of the wind power generation system according to the fifth embodiment.

In a case where the DC bus is configured as illustrated in FIG. 11, i.e., in a configuration where the smoothing capacitor 8 is connected to the DC/DC converter 7, if an accident occurs in the feeder 3, as illustrated in FIG. 12, the smoothing capacitor 8 causes discharge, and a discharge current flows toward the accident point. Here, in the wind power generation system according to this embodiment, since the reactors 12 are inserted in the feeders 3, an AC type current is superposed onto the accident current by means of a resonance phenomenon between the smoothing capacitor 8 and the reactors 12. Accordingly, if the reactors 12 are applied with an inductance value suitably set, a zero point is formed in the accident current, as illustrated in FIG. 13. In other words, the AC breakers 13 can cut off the accident current by opening the electrical path. In this way, in a case where the configuration illustrated in FIG. 11 is adopted, there is no need to include means for forming the zero point in the accident current, and so it is possible to greatly reduce the cost and device scale of the breakers installed in the feeders 3.

Further, since the reactors 12 are inserted in the feeders 3, the accident current and the discharge current from the smoothing capacitor 8 are suppressed by the reactors 12, and so there is provided an effect capable of lessening the current tolerance of each of the instruments, such as the AC breakers 13, connected to the feeders 3.

Figure 14:
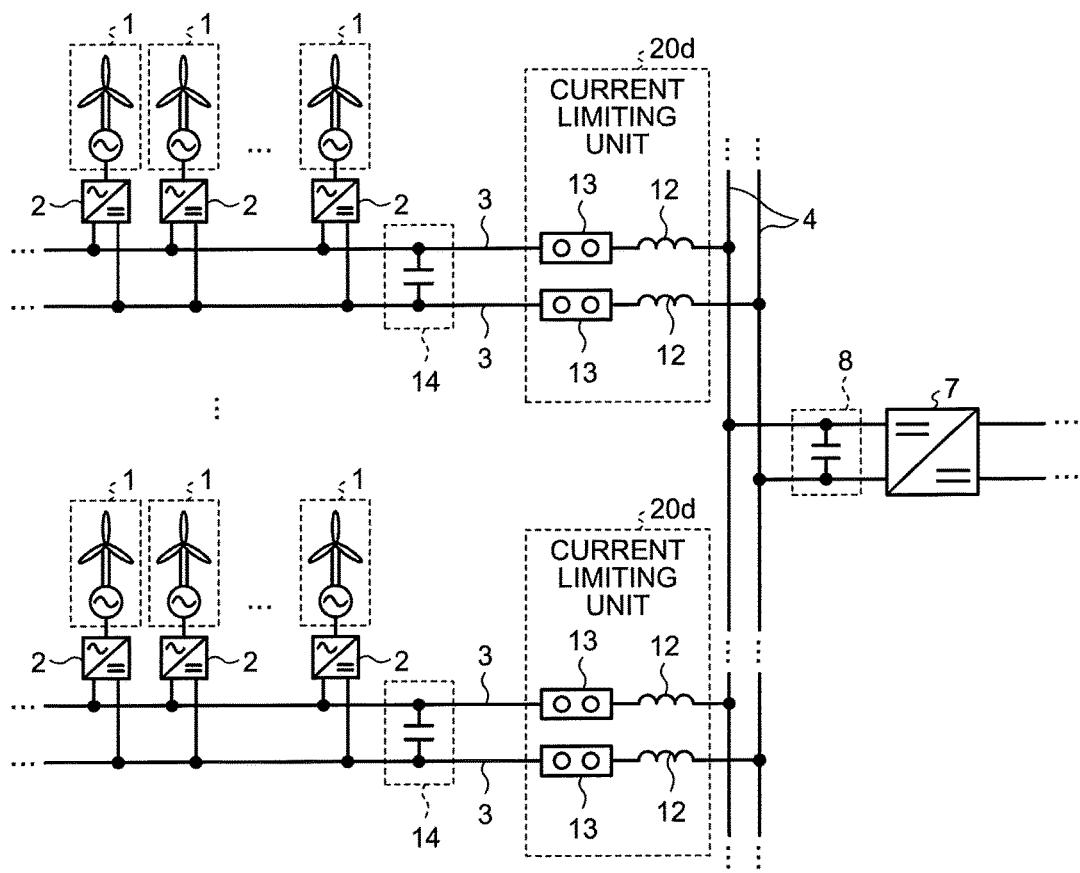
FIG. 14 is a view illustrating another configuration example of the wind power generation system according to the fifth embodiment.

According to the wind power generation system having the configuration illustrated in FIG. 11, even if an accident occurs in the DC bus 4, it can cut off the accident current. In a case where the feeders 3 are formed of cables, or depending on the configuration of the AC/DC converters 2, a large electrostatic capacity is expected to be present in each of them. If an accident occurs in the DC bus 4, currents flowing through the AC breakers 13 are small, and so an AC type current is superposed onto the accident current by means of a resonance phenomenon between the electrostatic capacity described above and the reactors 12, and thereby a current zero point is formed. Accordingly, the AC breakers 13 can cut off the accident current. Further, as illustrated in FIG. 14, there may be adopted a configuration that includes capacitors 14 added to the feeders 3 side, as a countermeasure for an accident in the DC bus 4. In a case where the configuration illustrated in FIG. 14 is adopted, if an accident occurs in the DC bus 4, it is possible to reliably cut off the accident current, thereby further improving the reliability of the system.

Figure 15:
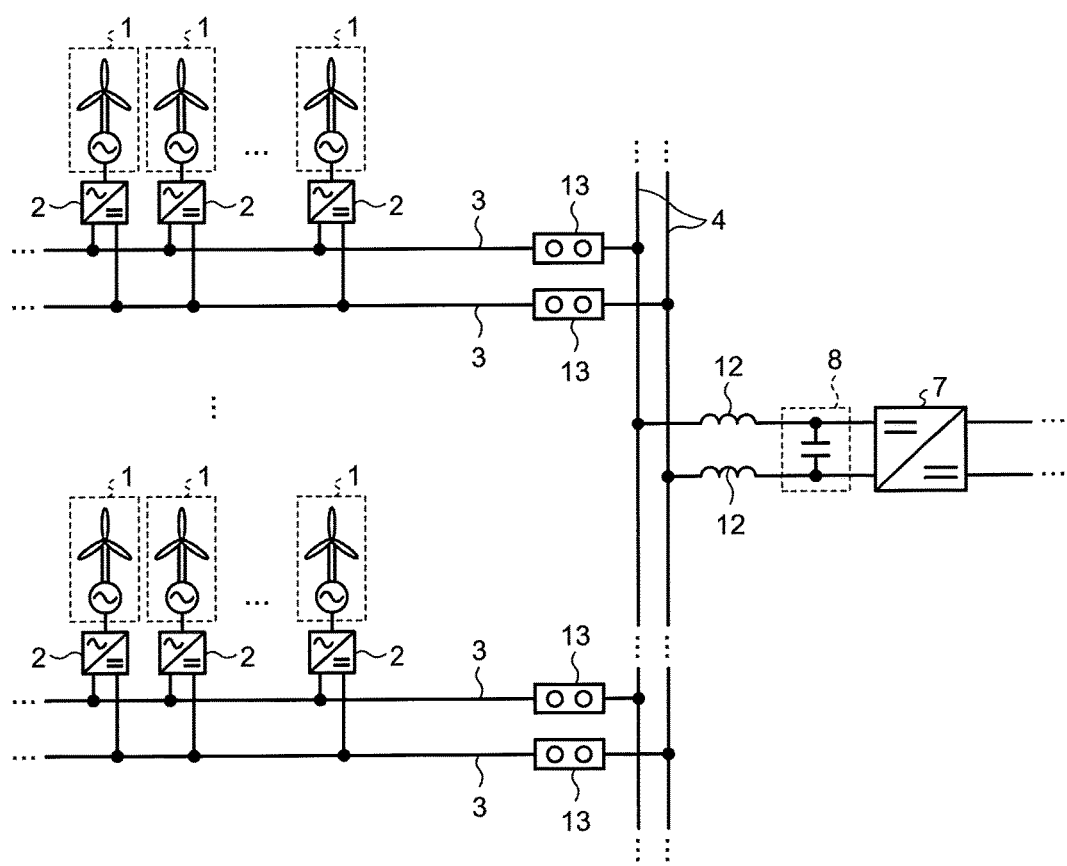
FIG. 15 is a view illustrating another configuration example of the wind power generation system according to the fifth embodiment.

It should be noted that, as illustrated in FIG. 15, the reactors 12 may be inserted between the DC bus 4 and the smoothing capacitor 8. According to this configuration, the scale of the reactors 12 becomes larger, but there is provided an effect capable of reducing the number of instruments. In a case where the configuration illustrated in FIG. 15 is adopted, if an accident occurs in the DC bus 4, it is difficult to cut off the accident current with a high speed. However, by controlling the wind power generators 1, it is possible to remove the accident, i.e., to prevent the accident current from flowing. In general, the DC bus 4 is connected to a GIS (gas-insulated switching device), and so it is considered to be a very rare case if an accident having occurred in the DC bus 4 has a significant impact on the feeders 3 side. Consequently, the configuration to remove an accident by controlling the wind power generators 1 is thought not cause a serious problem.

As described above, the wind power generation system according to this embodiment has a configuration that includes the smoothing capacitor 8 that is disposed between the DC bus 4 and the DC/DC converter 7 and smooths a DC power collected through each of the feeders 3 and the DC bus 4, and further includes the reactors 12 disposed at the connection points between each of the feeders 3 and the DC bus 4, or disposed between the DC bus 4 and the smoothing capacitor 8. Accordingly, the AC breakers 13 can be employed, and thereby it is possible to greatly reduce the cost and device scale of the breakers, and to lessen the current tolerance of each of the other instruments connected to the feeders 3.

Sixth Embodiment

An explanation will be given of a wind power generation system according to a sixth embodiment. Hereinafter, description about the constituent elements corresponding to those of the embodiments described above will be omitted.

Figure 16:
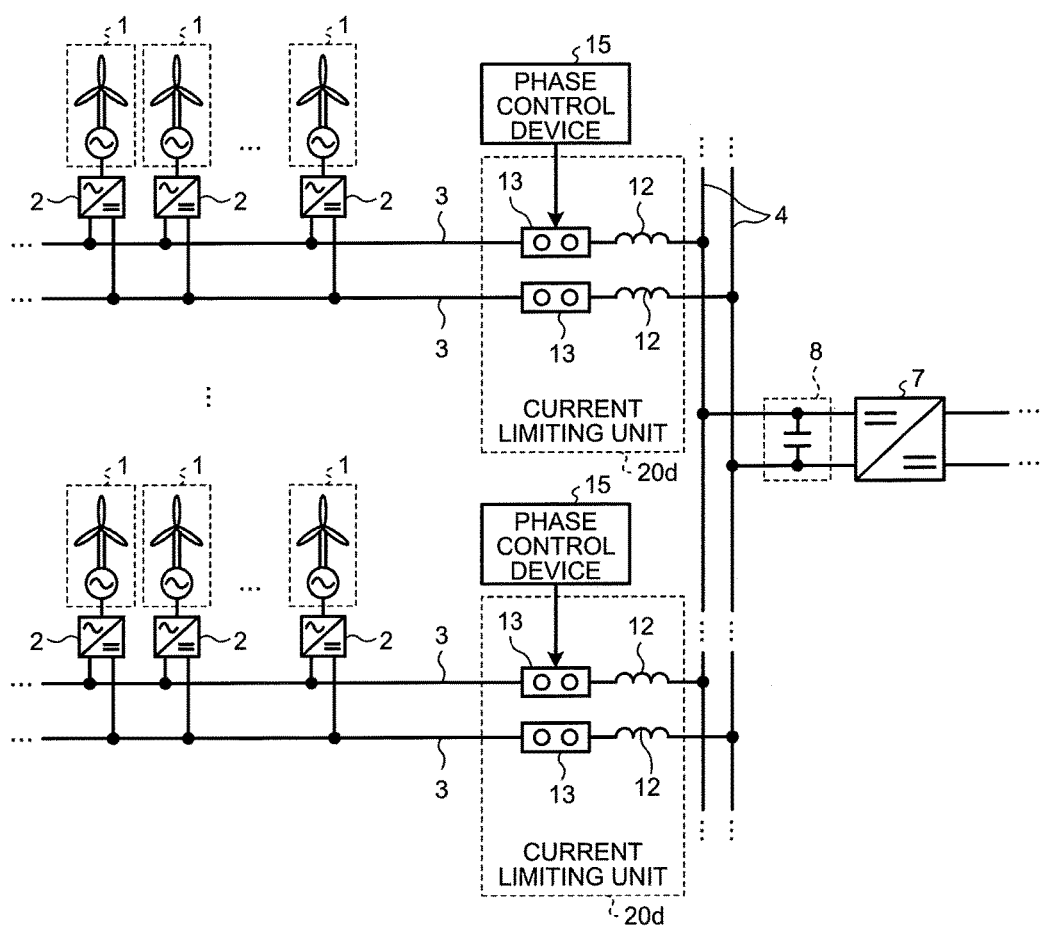
FIG. 16 is a view illustrating a configuration example of a wind power generation system according to a sixth embodiment.

FIG. 16 is a view illustrating a configuration example of the wind power generation system according to the sixth embodiment. As illustrated in FIG. 16, the wind power generation system according to this embodiment includes phase control devices 15 in addition to the wind power generation system according to the fifth embodiment illustrated in FIG. 11, and the phase control devices 15 control the operation execution timing of AC breakers 13. The phase control devices 15 at least determines the timing at which the AC breakers 13 start the opening operation, and instructs the AC breakers 13 to start the opening operation at the determined timing.

If an accident occurs in the feeder 3, the smoothing capacitor 8 starts discharging. At this time, as described in the fifth embodiment, since an AC type current is superposed onto the accident current, and thereby a zero point is formed in the accident current, the AC breakers 13 can cut off the accident current to remove the accident. However, until the AC breakers 13 complete the accident removal, the discharging of the smoothing capacitor 8 may continue, and cause the voltage to be lowered. If the voltage of the smoothing capacitor 8 is lowered, electric powers generated by the respective wind power generators 1 are used for charging the smoothing capacitor 8, immediately after the accident removal is completed. Consequently, until the charging is completed, power transmission to an onshore network is not performed, and so the onshore network may be greatly adversely affected.

Figure 17:
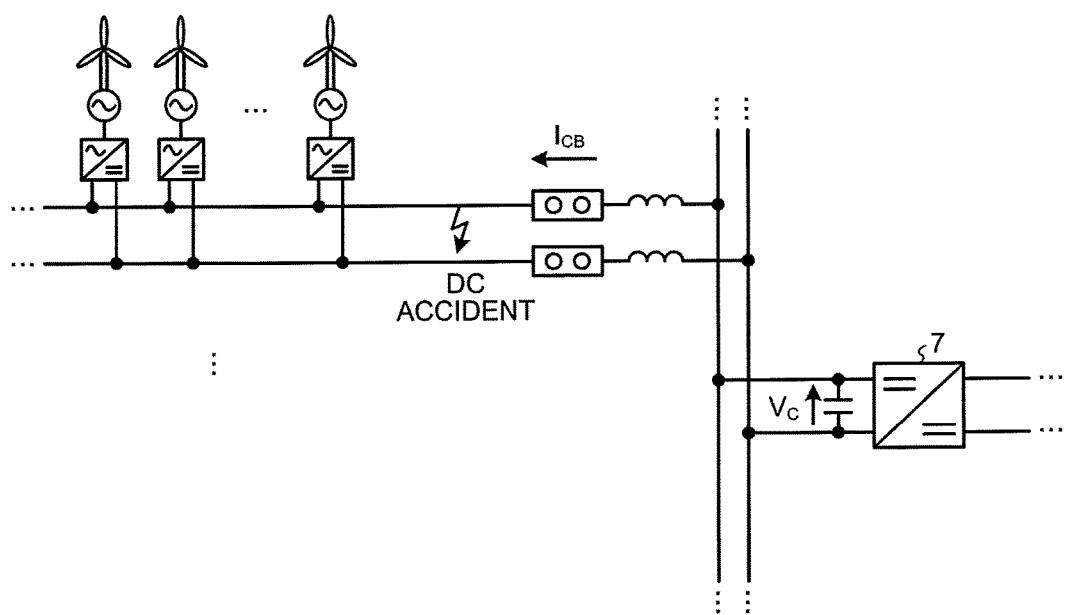
FIG. 17 is a view for explaining an operation of the wind power generation system according to the sixth embodiment.
Figure 18:
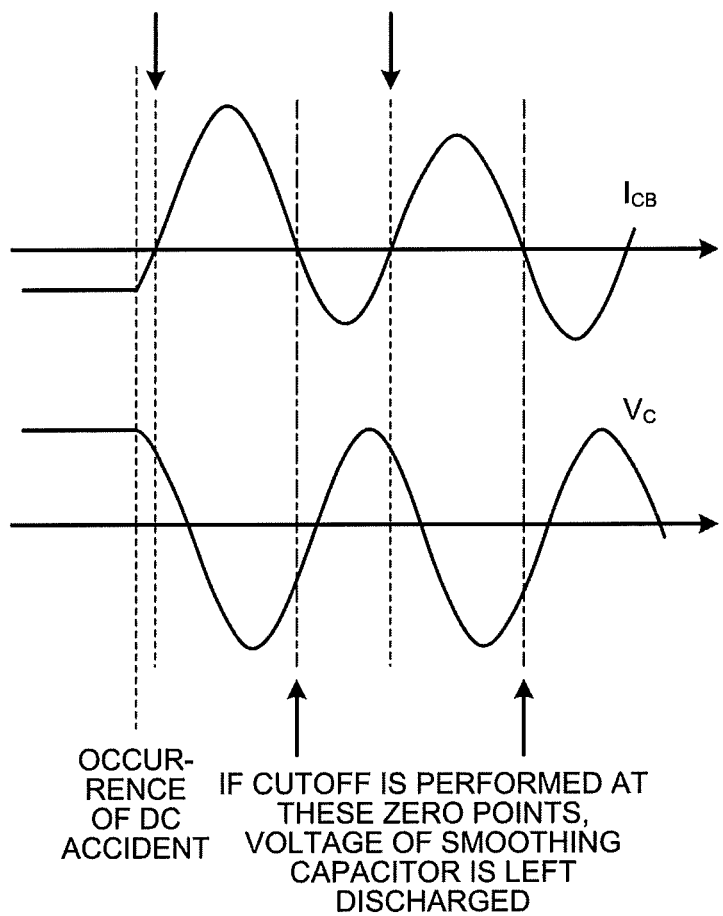
FIG. 18 is a view for explaining the operation of the wind power generation system according to the sixth embodiment.

Here, if a DC accident occurs as illustrated in FIG. 17, the voltage of the smoothing capacitor 8 repeats an increase due to charging and a decrease due to discharging as illustrated in FIG. 18. Consequently, in the wind power generation system according to this embodiment, the phase control device 15 controls the AC breakers 13 to shut the AC breakers 13 under a condition where the smoothing capacitor 8 holds a sufficient voltage. Consequently, it is possible to shorten the time necessary for restarting power transmission to the onshore network after the accident removal.

A current $I_{CB}$ flowing from the DC bus 4 side toward the accident point has a relationship with the voltage $V_C$ of the smoothing capacitor 8, as illustrated in FIG. 18. Accordingly, for example, the phase control device 15 observes the current $I_{CB}$, and instructs the AC breakers 13 to start the'opening operation such that they complete the opening operation at a target point that is a current zero point at which the voltage $V_C$ is in a high state, specifically, a current zero point formed in a zone where the current $I_{CB}$ is increasing.

As described above, the wind power generation system according to this embodiment has a configuration that includes the phase control devices 15 for controlling the operation start timing of the AC breakers 13, in addition to the wind power generation system according to the fifth embodiment. Consequently, it is possible to cut off the accident current under a condition where the voltage of the smoothing capacitor 8 is high, and to shorten the time necessary for restarting power transmission after the accident occurrence, thereby improving the reliability of the system.

REFERENCE SIGNS LIST

1 wind power generator, 2 AC/DC converter, 3 feeder, 4 DC bus, 5 DC breaker, 6 diode, 7 DC/DC converter, 8 smoothing capacitor, 9 switch, 10 current limiting element, 11 semiconductor DC breaker, 12 reactor, AC breaker, 14 capacitor, 15 phase control device, 20, 20a, 20b, 20c, 20d current limiting section.

The invention claimed is:

1. A wind power generation system comprising:
   a DC bus;
   a plurality of feeders to transmit DC powers to the DC bus, the feeders being connected to the DC bus;
   a plurality of wind power generators;
   a plurality of electric power conversion devices to convert AC powers generated by the wind power generators connected to the electric power conversion devices, into DC powers, and output the DC powers to the feeders, the electric power conversion devices being connected one by one to each of the wind power generators; and
   a current limiter to prevent a DC current from flowing from the DC bus into each of the feeders, the current limiter being installed on each of the feeders, wherein
   the current limiter includes:
   a DC breaker to cut off a DC current flowing from the feeder to the DC bus when the DC current exceeds a specified value, the DC breaker being disposed at a position where the DC current flowing from the feeder to the DC bus becomes maximum;
   a diode to prevent a DC current from flowing from the DC bus into the feeder, the diode being disposed between the DC breaker and the DC bus; and
   a switch to supply an activation DC power from the DC bus to the wind power generator and the electric power conversion device when the wind power generator and the electric power conversion device are in an operation stop state, and open an electrical path by use of a current zero point generated on activation of the wind power generator and the electric power conversion device after the wind power generator and the electric power conversion device are activated, the switch being connected in parallel with the diode.

2. The wind power generation system according to claim 1, further comprising a current limiting element connected in series with the switch.

3. A DC power transmission system comprising:
   a DC bus;
   a plurality of feeders to transmit, to the DC bus, DC powers each of which is obtained by converting an AC power generated by a wind power generator, the feeders being connected to the DC bus; and
   a current limiter to prevent a DC current from flowing from the DC bus into each of the feeders, the current limiter being installed on each of the feeders, wherein the current limiter includes:
a DC breaker to cut off a DC current flowing from the feeder to the DC bus when the DC current exceeds a specified value, the DC breaker being disposed at a position where the DC current flowing from the feeder to the DC bus becomes maximum;
a diode to prevent a DC current from flowing from the DC bus into the feeder, the diode being disposed between the DC breaker and the DC bus; and
a switch to supply an activation DC power from the DC bus to the wind power generator and an electric power conversion device to convert the AC power generated by the wind power generator into the DC power, when the wind power generator and the electric power conversion device are in an operation stop state, and open an electrical path by use of a current zero point generated on activation of the wind power generator and the electric power conversion device after the wind power generator and the electric power conversion device are activated, the switch being connected in parallel with the diode.

4. The DC power transmission system according to claim 3, further comprising a current limiting element connected in series with the switch.

5. A DC power transmission system comprising:
a DC bus;
a plurality of feeders to transmit, to the DC bus, DC powers each of which is obtained by converting an AC power generated by a wind power generator, the feeders being connected to the DC bus;
a smoothing capacitor connected to the DC bus;
a current limiter to prevent a DC current from flowing from the DC bus into each of the feeders, the current limiting unit being installed on each of the feeders, wherein
the current limiter includes;
an AC breaker disposed at a position where a DC current flowing from the feeder to the DC bus becomes maximum, and
a reactor disposed between the AC breaker and the DC bus, and wherein
the smoothing capacitor produces a resonance phenomenon with the reactor to allow an AC current to be superposed on an accident current flowing through the AC breaker when an accident occurs in the feeder, such that the AC breaker is opened to cut off a flow of the AC-current-superposed accident current therethrough at a point of time when the AC-current-superposed accident current becomes zero.

6. The DC power transmission system according to claim 5, further comprising a capacitor for taking a countermeasure against an accident and disposed between the AC breaker and an electric power conversion device to convert the AC power generated by the wind power generator into the DC power, wherein the accident-countermeasure capacitor produces the resonance phenomenon with the reactor to allow an AC current to be superposed on an accident current flowing through the AC breaker when an accident occurs in the DC bus, such that the AC breaker is opened to cut off a flow of the AC-current-superposed accident current therethrough at a point of time when the AC-current-superposed accident current becomes zero.

7. The DC power transmission system according to claim 5, further comprising a phase controller to determine a timing at which the AC breaker starts an opening operation.

* * * * *